(12) United States Patent
Mikes

(10) Patent No.: US 10,750,108 B2
(45) Date of Patent: Aug. 18, 2020

(54) IMAGE SENSOR WITH CORRECTION OF NON-UNIFORM DARK CURRENT

(71) Applicant: OmniVision Technologies, Inc., Santa Clara, CA (US)

(72) Inventor: Gabor Mikes, Oslo (NO)

(73) Assignee: OmniVision Technologies, Inc., Santa Clara, CA (US)

( * ) Notice: Subject to any disclaimer, the term of this patent is extended or adjusted under 35 U.S.C. 154(b) by 60 days.

(21) Appl. No.: 16/141,049

(22) Filed: Sep. 25, 2018

(65) Prior Publication Data

US 2020/0099875 A1    Mar. 26, 2020

(51) Int. Cl.
*H04N 5/361* (2011.01)
*H04N 5/369* (2011.01)

(52) U.S. Cl.
CPC ......... *H04N 5/361* (2013.01); *H04N 5/36963* (2018.08)

(58) Field of Classification Search
CPC ...... H04N 5/361; H04N 5/365; H04N 5/3651; H04N 5/36963; H04N 5/3696; H04N 5/36965; H04N 5/36961
See application file for complete search history.

(56) References Cited

U.S. PATENT DOCUMENTS

| | | | |
|---|---|---|---|
| 6,144,408 A | 11/2000 | MacLean | |
| 8,274,715 B2 | 9/2012 | Hamilton, Jr. et al. | |
| 8,405,747 B2 | 3/2013 | Mo et al. | |
| 8,508,629 B2 | 8/2013 | Mo et al. | |
| 8,698,922 B2 | 4/2014 | Zhang | |
| 9,154,750 B2 | 10/2015 | Pang | |
| 2008/0054320 A1* | 3/2008 | Solhusvik | H04N 5/3575 257/292 |
| 2009/0021612 A1* | 1/2009 | Hamilton, Jr. | H04N 5/3532 348/249 |
| 2010/0104209 A1* | 4/2010 | Deever | H04N 5/3675 382/260 |
| 2015/0312537 A1* | 10/2015 | Solhusvik | H04N 9/045 348/302 |
| 2016/0315112 A1* | 10/2016 | Park | H01L 27/14623 |

* cited by examiner

*Primary Examiner* — Luong T Nguyen
(74) *Attorney, Agent, or Firm* — Christensen O'Connor Johnson Kindness PLLC

(57) ABSTRACT

An imaging system comprises an image pixel array, a dark pixel array, and a controller. The image pixel array includes a plurality of pixel clusters adapted to generate image signals. The dark pixel array is adapted to generate one or more black reference signals corresponding to a global black level value of the imaging system. The controller includes logic that when executed by the controller causes the system to perform operations including determining local black level values for each of the pixel clusters and correcting a first image signal included in the image signals based, at least in part, on the global black level and a first local black level value included in the local black level values.

21 Claims, 5 Drawing Sheets

IMAGE SENSOR WITH CORRECTION OF NON-UNIFORM DARK CURRENT

TECHNICAL FIELD

This disclosure relates generally to image sensors, and in particular but not exclusively, relates to black level calibration for image sensors.

BACKGROUND INFORMATION

Image sensors have become ubiquitous and are now widely used in digital cameras, cellular phones, security cameras, as well as, medical, automobile, and other applications. As image sensors are integrated into a broader range of electronic devices and their functionally continually expands, it is desirable to enhance the performance metrics of image sensors in as many ways as possible (e.g., resolution, power consumption, dynamic range, and the like) through both device architecture design as well as through post-image acquisition processing.

The typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge of each of the pixels may be measured as an output voltage of each pixel that varies as a function of the incident image light. In other words, the amount of image charge generated is proportional to the intensity of the image light, which is utilized to produce a digital image (i.e., image data) representing the external scene. However, the image sensor may generate an inaccurate representation of the external scene due to dark current influencing the image charge (e.g., adding to the output voltage) measured from the individual pixels of the image sensor, which may hinder the image sensor from producing digital images that faithfully reproduce the optical characteristics (e.g., intensity, color, and the like) of the external scene.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1A:
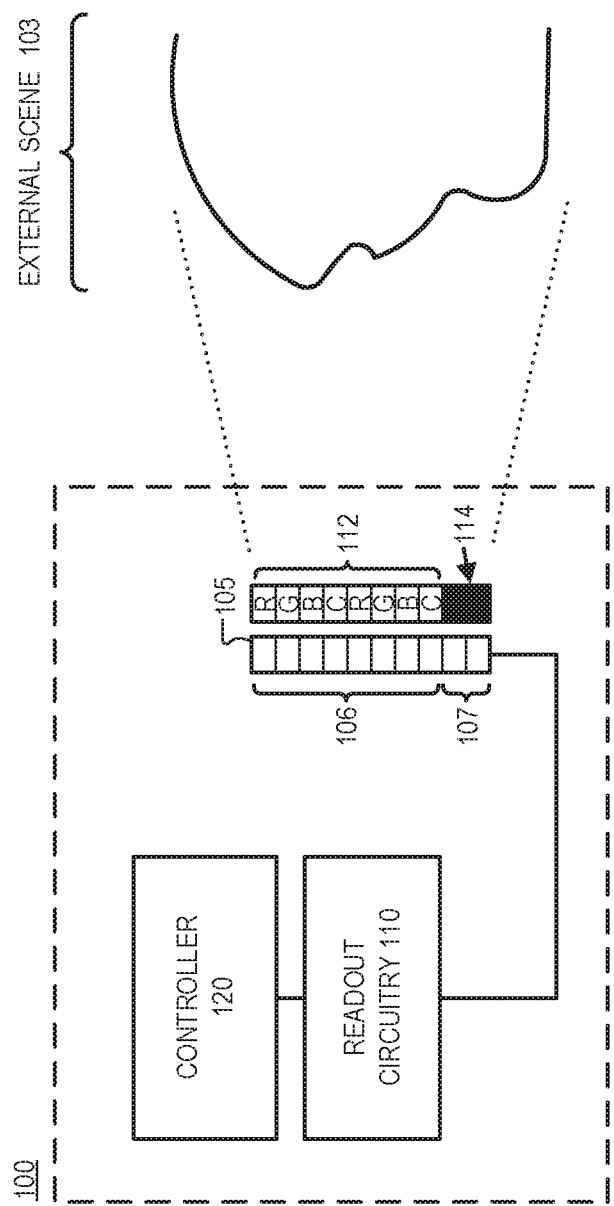
FIG. 1A is a functional block diagram illustrating an imaging system including an image pixel array optically coupled to a color filter array to capture a digital image or video of an external scene, in accordance with the teachings of the present disclosure.

Embodiments of an apparatus, system, and method for an imaging system or image sensor with non-uniformity correction are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

For any image sensor, but especially for automotive, surveillance, and astronomy image sensors, it is desirable to have a well-defined and accurate black level such that the digital image or video produced by the image sensor faithfully reproduces the optical characteristics of the external scene. Typically, the black levels when imaging daylight scenes are negligible when there is a large signal-to-noise ratio. However, in applications where there is an increased exposure time due to low-light conditions, the temperature is in the high end of the image sensor's operating range, or other such conditions in which there is a low signal-to-noise ratio the effect of dark current may become readily apparent. More specifically, the presence of non-uniformity in the dark current of the image sensor may emerge due to temperature gradients across the image sensor, process gradients, pixel output settlings, among other things.

Described herein are embodiments of an apparatus, an imaging system, and a method that may be utilized for comprehensive black level correction of image data (e.g., image signals generated by an image sensor in response to incident light). In particular, embodiments of the disclosure correct for non-uniform dark current (i.e., dark image non-uniformity) that may be prevalent when capturing images or videos in low light environments and/or high temperature operating conditions. The comprehensive black level correction of the imaging system corrects for the non-uniform dark current of an image pixel array by adjusting a global black level value of the image pixel array on a per pixel or per pixel cluster basis with a local gain correction factor determined from a local black level that is specific to the particular pixel or pixel cluster.

FIG. 1A illustrates a functional block diagram of an imaging system 100 including an image pixel array 106 optically coupled to a color filter array 112 to capture image signals representative of an image or video of an external scene 103. The illustrated embodiment of the imaging system 100 includes pixel array 105, the color filter array 112, light shield 114, readout circuitry 110, and controller 120. The pixel array 105 includes a plurality of individual pixels (e.g., photodiodes, photosensors, and the like) including a two-dimensional ("2D") image pixel array 106 and dark pixel array 107. In the illustrated embodiment, color filter 112 is optically coupled with a portion of the individual pixels included in the pixel array 105, which forms the image pixel array 106. The color filter array 112 includes a plurality of color filters (e.g., red, green, and blue) and panchromatic filters (e.g., clear, transparent, unfiltered, etc.) each associated with at least an individual one of the pixels included in the image pixel array 106. More specifically, the plurality of color filters and panchromatic filters of the color filter array 112 are arranged in a tileable manner with a minimal repeat unit (e.g., RGBC as illustrated, which corresponds to a red, green, blue, and clear filter) to form a plurality of pixel clusters of the image pixel array 106.

Groups of the image signals generated by the image pixel array 106 are associated with a respective one of the pixel clusters. Each of the groups of the image signals includes a plurality of color signals and a panchromatic signal, which cumulatively is representative of a color and intensity of the corresponding pixel cluster. Each of the pixel clusters captures a plurality of color signals included in the image signals, which in combination, are representative of the spectrum of visible light. More specifically, the color filters of each of the pixel clusters include at least one filter each of primary (e.g., red, green, and blue) or secondary (e.g., cyan, magenta, and yellow) color filters that additively cover the spectrum of visible light. In the illustrated embodiment, individual pixels of the image pixel array 106 optically coupled to a red color filter ("R") of the color filter array 112 correspond to red pixels and capture color signals representative of the intensity of red light in the external scene 103. Similarly, individual pixels optically coupled to a blue color filter ("B") or a green color filter ("G") correspond to blue or green pixels and capture color signals representative of the intensity of blue or green light of the external scene 103, respectively. Each of the pixel clusters also includes at least one individual pixel optically coupled to a panchromatic filter (e.g., clear, transparent, unfiltered) that captures a panchromatic signal representative of the intensity of the spectrum of unfiltered visible light (e.g., white light). Thus, collectively, each of the pixel clusters capture image signals including a plurality of color signals and a panchromatic signal, which are utilized to determine a color, a color intensity, and a local black level of corresponding pixel clusters.

The dark pixel array 107 of pixel array 105 is optically coupled to light shield 114. The light shield 114 optically shields (e.g., via an opaque metal layer or otherwise) at least the photosensitive region of the individual pixels included in the dark pixel array 107 from being exposed to incident light. Rather than generate signals based on incident light, the dark pixel array 107 generates one or more black reference signals based on the dark current of the individual pixels within the dark pixel array 107. The one or more black reference signals are subsequently utilized to determine a global black level value of imaging system 100 for correcting the image signals generated by the image pixel array 106.

The image signals and the one or more black reference signals generated by the pixel array 105 are analog signals which may be sampled with readout circuitry 110 coupled to the pixel array 105. Readout circuitry 110 may further include amplification circuitry, analog-to-digital ("ADC") circuitry, global and/or local black level correction circuitry, image buffers, or otherwise. Readout circuitry 110 is operable via controller 120 which controls operation (pre, post, and in situ) of the imaging system 100. In the illustrated embodiment, readout circuitry 110 is separate from the controller 120. However, in other embodiments readout circuitry 110 may be included in the controller 120.

Figure 1B:
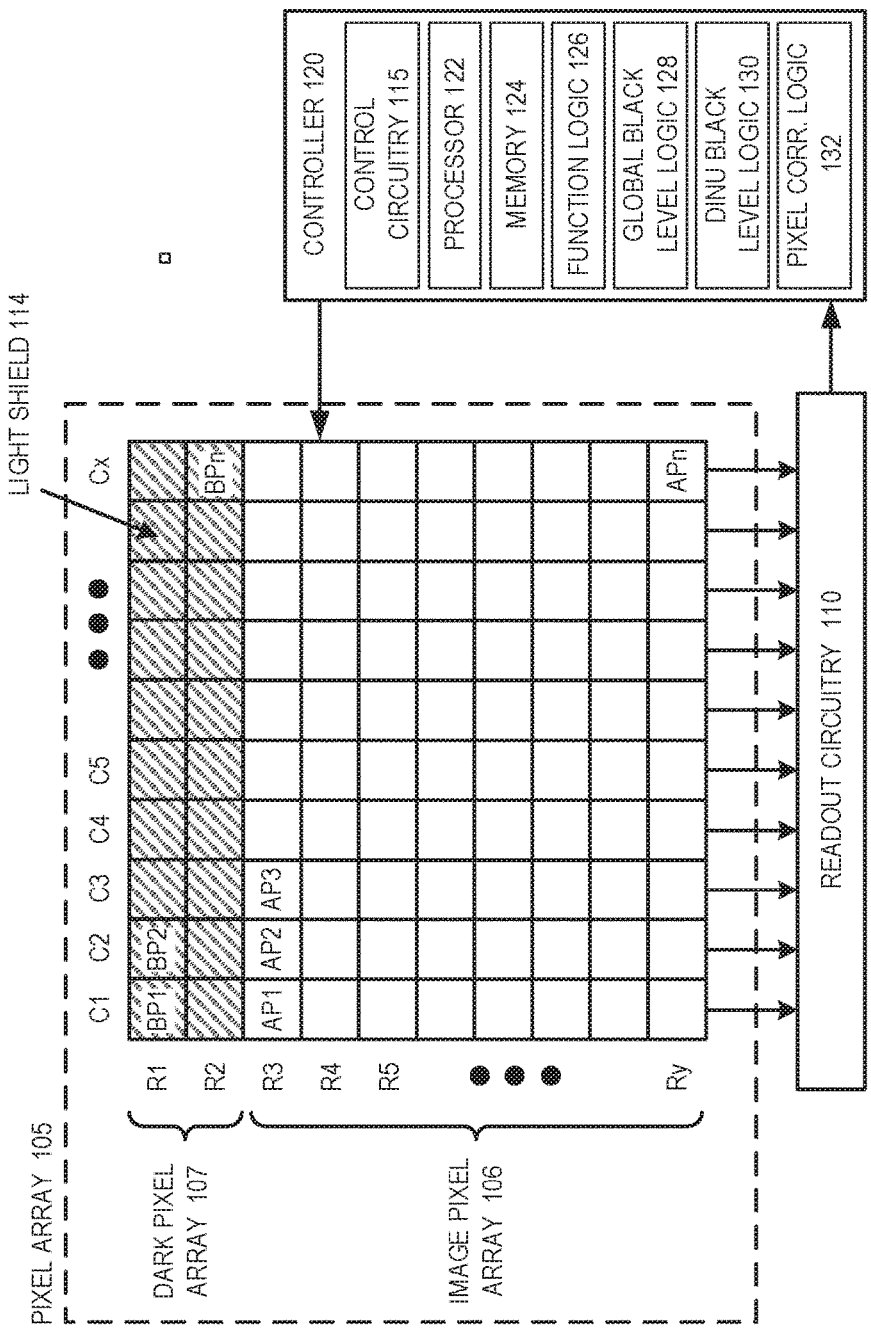
FIG. 1B is a functional block diagram of an imaging system, in accordance with the teachings of the present disclosure.

FIG. 1B illustrates a more detailed view of the functional block diagram of the imaging system 100, in accordance with the teachings of the present disclosure. The illustrated embodiment of the imaging system 100 includes pixel array 105, readout circuitry 110, light shield 114, and controller 120. The imaging system 100 also includes the color filter array 112 (as illustrated in FIG. 1A), which has been omitted to prevent obscuring certain aspects. The pixel array 105 includes the image pixel array 106 and the dark pixel array 107. The controller 120 includes control circuitry 115, processor 122, memory 124, function logic 126, global black level logic 128, dark image non-uniformity (DINU) logic 130, and pixel correction logic 132.

The illustrated embodiment of the pixel array 105 includes the two-dimensional ("2D") image pixel array 106 and dark pixel array 107. The image pixel array 106 includes the plurality of individual imaging pixels (AP1, AP2, AP3, . . . , APn) for capturing the image signals representative of an external scene (e.g., the external scene 103 of FIG. 1A) in response to incident light. The dark pixel array 107 includes a plurality of individual black reference pixels (BP1, BP2, . . . , BPn) for capturing one or more black reference signals corresponding to a global black level value of the imaging system 100. In one embodiment, each of the plurality of imaging pixels is an active pixel sensor, such as a complementary metal oxide image sensor pixel. In some embodiments, the individual black reference pixels include similar or identical structure to that of either active pixel counterparts with at least one exception being that they are shielded from receiving light by a light blocking layer (e.g., the illustrated light shield 114 of FIG. 1A).

As illustrated, each of the active pixels of the image pixel array 106 are arranged in rows (e.g., rows R3 to Ry) and columns (e.g., columns C1 to Cx) to acquire image data (e.g., image signals) of an external scene (e.g., a person, place, or object) which can then be used to render a digital image or video of the external scene. The individual black reference pixels (e.g., BP1 through BPn) of dark pixel array 107 included in the pixel array 105 are also arranged in rows (e.g., rows R1 to R2) and columns (e.g., columns C1 to Cx) to capture one or more black reference signals for determining a global black level value of imaging system 100. The individual black reference pixels are shielded from light by light shield 114 (e.g., a metal thick enough to block light from reaching dark pixel array 107) such that signals from the individual black reference pixels are representative of dark current in imaging system 100. In some embodiments, a row of the individual black reference pixels within dark pixel array 107 resemble a row of active pixels of image pixel array 106 as close as possible to provide an accurate representative of the dark current (e.g., global black level value) for the image pixel array 106. In the same or other embodiments, black rows are readout (e.g., via readout circuitry 110) and processed (e.g., via controller 120) before active rows (e.g., of pixels in image pixel array 106) such that the black level correction values may be applied to the readout of the active row. In embodiments of the disclosure, the global black level value is used in conjunction with a local black level determined from the individual imaging pixels of the image pixel array 106 to correct the image signals. It is appreciated that the illustrated configuration of the pixel array 105 is just one embodiment of many possible configurations. In other embodiments, the dark pixel array 107 may be formed in other regions of the pixel array 105, such as the center of the pixel array 105, or even run along two opposing sides of the image pixel array 106. In some embodiments the dark pixel array 107 may share common rows or columns as the image pixel array.

The readout circuitry 110 may include amplification circuitry, analog-to-digital conversion ("ADC") circuitry, global and local black level correction circuitry, image buffers, or otherwise. In the illustrated embodiment, readout circuitry 110 samples and transmits the image signals and the black reference signals respectively from the pixel array 105 to the controller 120. In some embodiments, the readout circuitry 110 is included in the controller 120.

The controller 120 includes logic and/or circuitry to control the operation (e.g., during pre-, post-, and in situ phases of image and/or video acquisition) of the various components of the imaging system 100. The controller 120 may be implemented as hardware logic (e.g., application specific integrated circuits, field programmable gate arrays, system-on-chip, etc.), software/firmware logic executed on a general purpose microcontroller or microprocessor, or a combination of both hardware and software/firmware logic. In one embodiment, the controller 120 is coupled to memory 124 to store instructions for execution by the controller 120. The instructions, when executed by the controller 120 may cause the imaging system 100 to perform operations that correspond to the various functional modules of control circuitry 115, the function logic 126, the global black level logic 128, the DINU black level logic 130, the pixel correction logic 132, or otherwise. The memory is a non-transitory computer-readable medium that may include, without limitation, a volatile (e.g., RAM) or non-volatile (e.g., ROM) storage system readable by controller 120.

In the illustrated embodiment, the various logic and/or circuitry modules 115-132 of controller 120 are utilized to capture an image or video of an external scene (e.g., represented by image signals each associated with a corresponding pixel of the image pixel array 106) and subsequently correct one or more of the image signals on a per pixel or per pixel cluster basis based, at least in part, on a global black level value and a local black level value of a corresponding one of the pixel clusters. Advantageously, the correction of the image signals on a per pixel or per pixel cluster basis compensates for non-uniform dark current which may be caused by, inter alia, temperature gradients across the pixel array 105, process gradients, and pixel output settlings. Control circuitry 115 may control operational characteristics of the image pixel array 106 and dark pixel array 107. Function logic 126 may store the image signals as image data and even manipulate the image data (e.g., apply post image effects such as crop, rotate, remove red eye, adjust brightness, adjust contrast, or otherwise). Global black level logic 128 may be coupled to receive the one or more black reference signals from the dark pixel array 107 for determining a global black level value of the imaging system 100. The DINU black level logic 130 may be coupled to receive the image signals from the image pixel array 106 to determine a local black level value for each of the individual pixels in the image pixel array 106. The DINU black level logic 130 may subsequently generate a 2D gain array utilizing the local black level values which is interpolated to determine a local gain correction factor for one or more pixels or pixel clusters of the image pixel array 106. The pixel correction logic 132 may adjust the global black level value on a per pixel or per pixel cluster basis with the local gain correction factor to compensate for non-uniformity of dark current within the image pixel array 106. The adjusted global black level value may then be utilized to correct the image signal of the corresponding pixel and/or pixel cluster.

Figure 2:
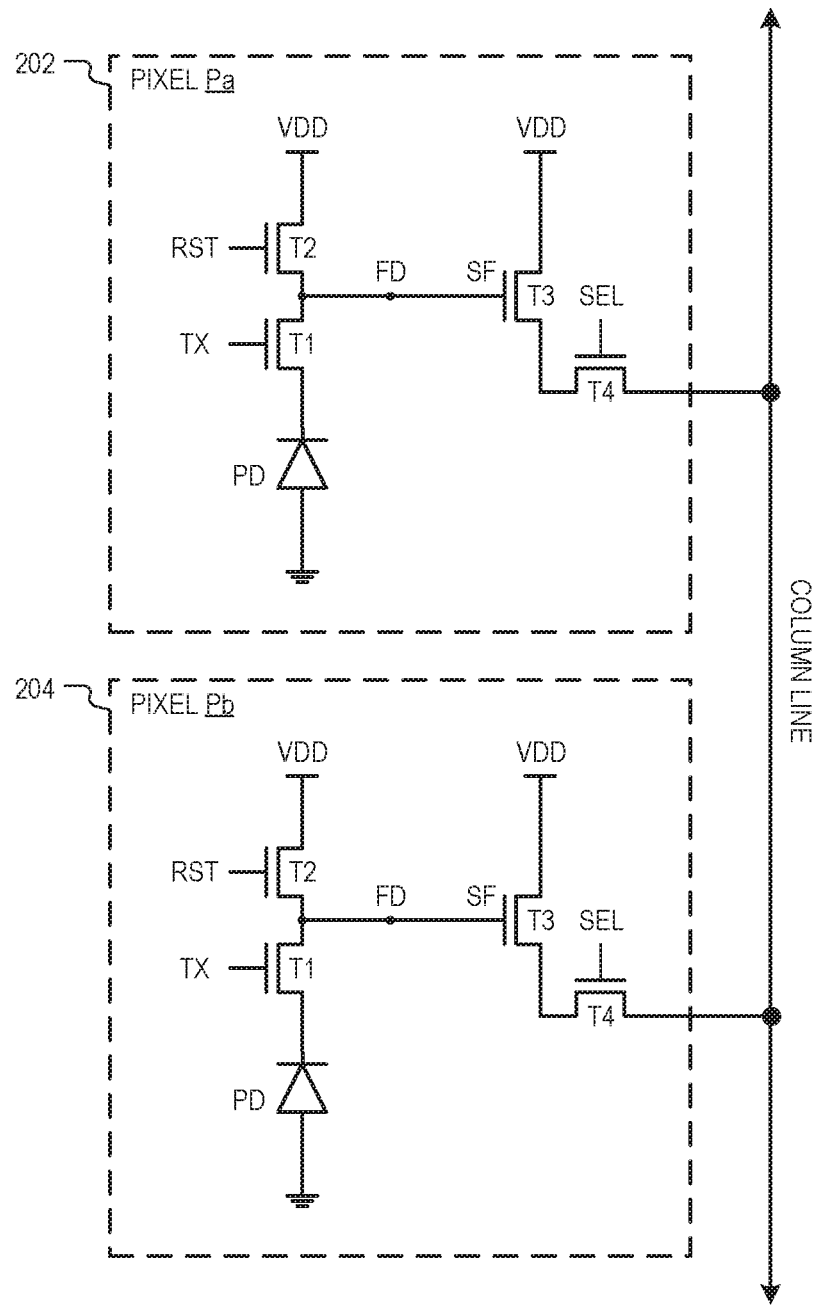
FIG. 2 is a circuit diagram illustrating pixel circuitry for two four-transistor pixels, which may be included in the imaging system of FIGS. 1A-1B, in accordance with the teachings of the present disclosure.

FIG. 2 is a circuit diagram 200 illustrating pixel circuitry for two four-transistor pixels 202 (pixel Pa) and 204 (pixel Pb), which may be included in the imaging system 100 of FIGS. 1A-1B, in accordance with the teachings of the present disclosure. The pixels Pa and Pb are arranged in two rows and one column. The illustrated embodiment of each pixel in pixel circuitry 200 includes a photodiode PD, a transfer transistor T1, a reset transistor T2, a source-follower ("SF") transistor T3, and a select transistor T4. During operation, transfer transistor T1 receives a transfer signal TX, which transfers the charge accumulated in photodiode PD, in response to incident light, to a floating diffusion node FD. In one embodiment, the floating diffusion node FD can be coupled to a storage capacitor for temporarily storing image charges (not illustrated). Reset transistor T2 is coupled between a power rail VDD and the floating diffusion node FD to reset (e.g., discharge or charge the FD to a preset voltage) under control of a reset signal RST. The floating diffusion node FD is coupled to control the gate of SF transistor T3. SF transistor T3 is coupled between the power rail VDD and select transistor T4. SF transistor T3 operates as a source-follower providing a high impedance output from the pixel. Finally, select transistor T4 selectively couples the output of pixel circuitry 200 to the column readout line (also referred to as a bit line or a data bit line) under control of a select signal SEL. The data readout from the pixel onto the bit line is an analog signal, which may be received by readout circuitry (e.g, readout circuitry 110 of FIGS. 1A-1B) for conversion to a digital signal (e.g., image signal and/or black reference signals). In one embodiment, the TX signal, the RST signal, and the SEL signal are generated by control circuitry (e.g., the control circuitry 115 included in the controller 120 illustrated in FIG. 1B).

Figure 3:
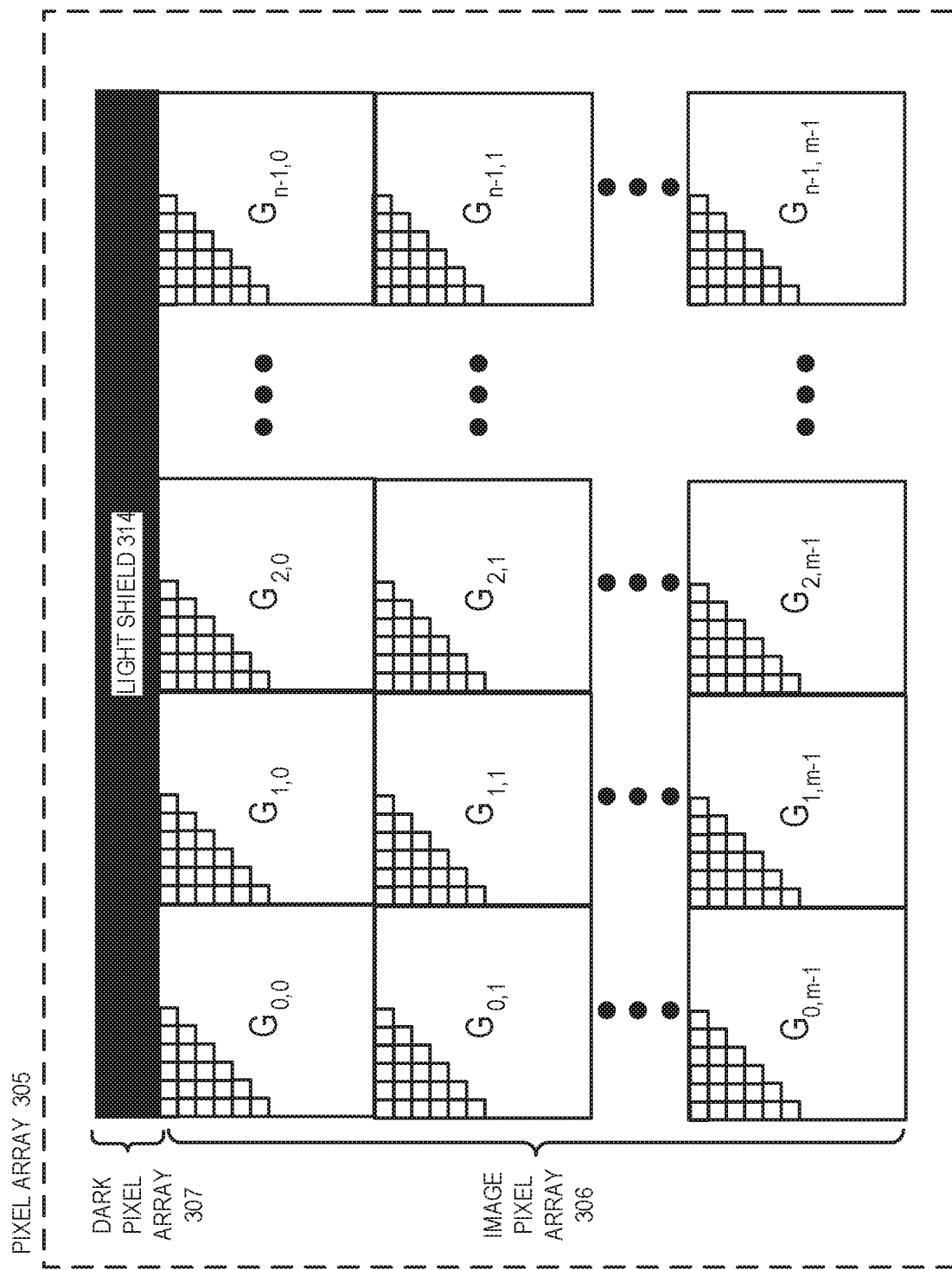
FIG. 3 is a functional block diagram illustrating a pixel array including an image pixel array divided into different subsections that may each be independently calibrated for black level correction, in accordance with the teachings of the present disclosure.

FIG. 3 is a functional block diagram illustrating a pixel array 305 including an image pixel array 306 divided into different subsections that may each be independently calibrated for black level correction, in accordance with the teachings of the present disclosure. Pixel array 305 is one possible implementation of the pixel array 105 of FIGS. 1A-1B for the imaging system 100. Referring back to FIG. 3, pixel array 305 includes image pixel array 306 to generate image signals and dark pixel array 307 to generate one or more black reference signals. The image pixel array 306 may correspond to the image pixel array 106 illustrated in FIGS. 1A-1B and include a plurality of individual pixels (e.g., AP1, AP2, AP3, . . . , APn of FIG. 1B) optically coupled to individual filters (e.g., red, green, blue, and panchromatic filters) of a color filter array (e.g., color filter array 112 of FIG. 1A). The dark pixel array 307 may correspond to the dark pixel array 107 illustrated in FIGS. 1A-1B and include a plurality of individual pixels (e.g., BP0, BP1, . . . , BPn of FIG. 1B) optically coupled to the light shield 314 (e.g., light shield 114 of FIG. 1A). Referring back to FIG. 3, the one or more black reference signals are associated with dark current of individual pixels included in the dark pixel array 307 and may be utilized to determine a global black level value of the pixel array 305. The image signals generated by the image pixel array 306 are used to generate a digital image or video of an external scene. However, the image signals may not accurately represent the external scene due to inaccuracies caused by dark current present in the image signals of the individual pixels within the image pixel array 306.

The global black level value may be used to correct the image signals when the dark current is near constant and/or the signal-to-noise ratio is high such that the dark current has little to no influence on the image signal. However, during low light conditions when the signal-to-noise ratio is substantially lower, if there is a non-uniformity in the dark current (e.g., the dark current isn't substantially constant for all pixels in the pixel array 305) across the image pixel array 305 (e.g., due to a temperature gradient caused by operating near the high end of the system's operating temperature and/or operating in a low light environment), then it may be desirable to correct the image signal on a per pixel or per pixel cluster basis to compensate for the non-uniformity.

To compensate for the non-uniformity in dark current, the image pixel array 306 is divided into different subsections (e.g., individual pixels or pixel clusters arranged in a rectangular, square, or otherwise tileable subsections of the image pixel array 305) to determine a gain factor for each of the different subsections. In some embodiments, each of the different subsections may correspond to a 2D array of pixels or pixel clusters (e.g., a 16×9 array of pixels). The gain factor of each of the different subsections may subsequently be combined to generate a 2D gain array, which via interpolation, may be used to determine a local gain correction factor of individual pixels or pixel clusters within the image pixel array 306. As illustrated, the gain factor of each of the different subsections may be represented as $G_{0,0}$, $G_{1,0}$, $G_{0,1}$, ..., $G_{n-1,m-1}$, which collectively form the 2D gain array. Based on the image signal associated with a particular one of the pixels or pixel clusters, a corresponding gain correction factor, $g_{x,y}$, may be interpolated from the 2D gain array and used to adjust the global black level value for that particular pixel or pixel cluster. The adjusted global black level value may then be subtracted or otherwise removed from the image signal to correct the image signal of the particular pixel and/or pixel cluster.

Figure 4:
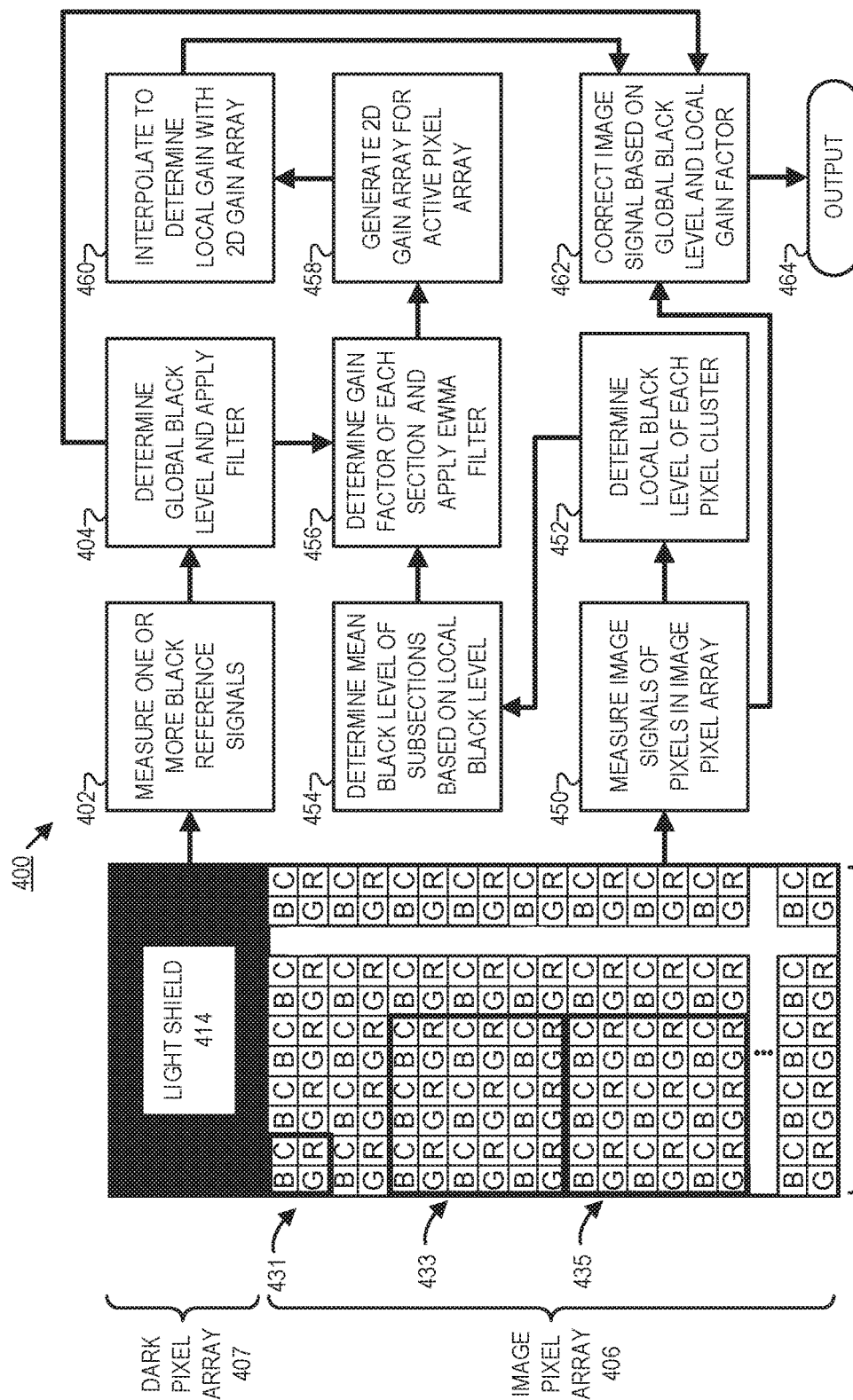
FIG. 4 shows a method for black level calibration that utilizes self-calibrating dark image non-uniformity correction to remove black level error, in accordance with the teachings of the present disclosure.

FIG. 4 shows a method 400 for black level calibration that utilizes self-calibrating dark image non-uniformity correction to remove black level error, in accordance with the teachings of the present disclosure. Also, illustrated in FIG. 4, is pixel array 405 which is one possible implementation of pixel array 105 of FIGS. 1A-1B (and pixel array 305 of FIG. 3) for the imaging system 100. Referring back to FIG. 4, pixel array 405 includes an image pixel array 406 (e.g., which corresponds to image pixel array 106 of FIGS. 1A-1B) including a plurality of pixel clusters (e.g., first pixel cluster 431) adapted to generate image signals in response to incident light. The image pixel array 406 includes a plurality of individual pixels (e.g., AP1, AP2, AP3, . . . , APn of FIG. 1B) optically coupled to individual filters (e.g., red, green blue, and panchromatic filters) of a color filter array (e.g., color filter array 112 of FIG. 1A). Each of the individual pixels of the image pixel array 406 are coupled to a specific one of the filters of the color filter array and are grouped together to form a plurality of pixel clusters, with each pixel cluster representative of a minimal repeat unit of the image pixel array 406. In the illustrated embodiment, an RGBC color filter array is utilized, in which each pixel cluster corresponds to an array of individual pixels including at least one red "R" pixel, one green "G" pixel, one blue "B" pixel, and one panchromatic "C" pixel adjacently located next to one another (e.g., the first pixel cluster 431 comprising a 2×2 array of individual pixels). While the illustrated embodiment of image pixel array 406 includes an RGBC color filter with a 2×2 minimal repeat unit, it is appreciated that other color filter arrays and minimal repeat units may also be utilized (e.g., RGBC color filter array with a minimal repeat unit of an array of 2×4, 4×4, or otherwise of individual pixels and a color filter array with other filters such as cyan, magenta, and yellow filters rather than red, green, and blue filters). It is also appreciated that in some embodiments, the minimal repeat unit of the color filter array may not necessarily define a pixel cluster (e.g., the minimal repeat unit of the color filter array be a 2×2 array of filters, but an individual pixel cluster may correspond to a 4×6 or 6×6 array of individual pixels).

Each of the individual pixels of the image pixel array 406 generate image signals which are grouped together based on their association with a respective one of the pixel clusters (e.g., image signals from the red, green, blue, and clear pixels included in the first pixel cluster 431 may form a first group of image signals included in the groups of image signals). In the illustrated embodiment, groups of image signals associated with each one of the pixel clusters include a plurality of color signals (e.g., red, green and blue color signals) and at least one panchromatic signal, which are measured, respectively, from the red, green, blue, and clear pixels of a corresponding one of the pixel clusters (e.g., the first pixel cluster 431). The pixel clusters may also be grouped into an array of pixel clusters to form different subsections (e.g., first subsection 433 and second subsection 435) representative of the image pixel array 406. In the illustrated embodiment, first subsection 433 and second subsection 435 are included in the different subsections and each include a 3×3 array of pixel clusters (or 6×6 array of individual pixels). The arrangement of the different subsections may be tileable and/or repeatable to include each individual pixel of the image pixel array 406.

Pixel array 405 also includes a dark pixel array 407, which corresponds to the dark pixel array 107 of FIGS. 1A-1B. Referring back to FIG. 4, each of the individual pixels included in the dark pixel array 407 are optically coupled to light shield 414 (e.g., light shield 114 of FIG. 1A) to generate one or more black reference signals corresponding to a global black level value of an imaging system (e.g., imaging system 100 of FIGS. 1A-1B).

Process 400 is a method for black level calibration that utilizes a self-calibrating dark image non-uniformity (DINU) correction to remove black level error, which may arise when capturing images with an imaging system (e.g., imaging system 100 illustrated in FIGS. 1A-1B) in low light conditions and/or operating at elevated temperatures. In the illustrated embodiment, method 400 is applied on a frame-by-frame basis. In other words, the black level calibration is updated for each frame captured by the imaging system and subsequently used to correct for black level error resultant of dark current present within the image signals.

Block 402 illustrates measuring and/or receiving one or more black reference signals. The one or more black reference signals may be generated concurrently by dark pixel array 407 when capturing an image frame with an imaging system (e.g., imaging system 100 illustrated in FIGS. 1A-1B). Each individual pixel included in the dark pixel array 407 is optically coupled to light shield 414 such that the black reference signal measured is representative of dark current of a corresponding one of the pixels. Collectively, the one or more black reference signals representative of a global black level value of the imaging system.

Block 404 shows determining a global black level value and applying an optional filter in response to measuring the one or more black reference signals. The applied filter may be a median filter to remove outlier black reference signals that are incorrect or otherwise fail to provide an accurate representation of the dark current for the pixels included in the dark pixel array 407. The mean global black level value may then be determined by averaging the black reference signals together (e.g., each of the signals is summed together and the sum is subsequently divided by the total number of black reference signals). The (mean) global black level value represents a baseline correction value that is utilized for black level calibration of the imaging system. However, as mentioned previously, if the dark current is not constant across the pixel array 405 (e.g., as is generally the case when operating in low-light and/or high temperature conditions) or the signal-to-noise ratio is low then a local non-uniformity of dark current may emerge.

Block 450 illustrates measuring and/or receiving image signals. The image signals may be generated from individual pixels in the image pixel array 406 in response to incident light, which may occur concurrently with block 402. As discussed above, groups of the image signals are associated with a respective one of the pixel clusters (e.g., first pixel cluster 431). Each of the groups of the image signals includes a plurality of color signals (e.g., a red color signal, a green color signal, and a blue color signal, which are respectively representative of a red pixel, a green pixel, and a blue pixel) and a panchromatic signal (representative of a clear pixel) of a particular one of the pixel clusters.

Block 452 shows determining a local black level of each pixel cluster based on the color signals and the panchromatic signal of a respective one of the pixel clusters. For example, the local black level of the first pixel cluster 431 may be determined from a first group of image signals included in the groups of image signals associated with the first pixel cluster 431. This is based, at least in part, on the expectation that each pixel in a particular pixel cluster has an approximately equal offset component (e.g., fixed noise) and that the clear pixel should have a signal component (e.g., photon flux) proportional to the sum of the red, green, and blue pixel signal components. In other words, the panchromatic signal is proportional to the sum of the color signals for each of the pixel clusters, which may be leveraged to determine a local black level value.

More specifically, it is assumed that the signal of an individual pixel corresponds to:

$$S = L*QE + BL \tag{1}$$

where S corresponds to the image signal from an individual pixel, L is the portion determined by photon flux (number of photons per second per unit area), BL is the black level (e.g., dark current contribution to the image signal), and QE is the quantum efficiency for the individual pixel. It is noted that the term quantum efficiency refers to the integral response to a broad spectrum white light (e.g., inclusive of the visible range of wavelengths). The integral response (i.e., quantum efficiency) for each of the individual pixels is a constant value calculated during a pre-calibration (e.g., factory calibration) step in which the imaging system is exposed to a broad, white spectrum light of known luminance.

Equation (1) may be rearranged with respect L, such that:

$$L = \frac{(S - BL)}{QE}. \tag{2}$$

This relationship may be leveraged since it is expected that in an ideal pixel cluster (e.g., an RGBC cluster of pixels such as the first pixel cluster 431), the clear pixel ($L_C$) will have the following relationship with the red, green, and blue pixels ($L_R$, $L_G$, and $L_B$):

$$L_C = L_R + L_G + L_B \tag{3}.$$

Equations (3) and (2) may be combined to describe the relationship between the different components to an individual one of the pixel clusters to become:

$$\frac{S_C - BL}{QE_C} = \frac{S_R - BL}{QE_R} + \frac{S_G - BL}{QE_G} + \frac{S_B - BL}{QE_B}. \tag{4}$$

An approximation of equation (4) may be utilized to extract black level information from each pixel cluster as follows:

$$\frac{BL}{QE_R} + \frac{BL}{QE_G} + \frac{BL}{QE_B} - \frac{BL}{QE_C} = \frac{S_R}{QE_R} + \frac{S_G}{QE_G} + \frac{S_B}{QE_B} - \frac{S_C}{QE_C}. \tag{5}$$

Equation (5) may subsequently be rearranged to:

$$BL*\left(\frac{1}{QE_R} + \frac{1}{QE_G} + \frac{1}{QE_B} - \frac{1}{QE_C}\right) = \frac{S_R}{QE_R} + \frac{S_G}{QE_G} + \frac{S_B}{QE_B} - \frac{S_C}{QE_C}. \tag{6}$$

Since it is assumed that the quantum efficiency values for each of the individual pixels is constant, equation (6) may further be simplified/approximated by defining a constant (Q) as:

$$Q = \left(\frac{1}{QE_R} + \frac{1}{QE_G} + \frac{1}{QE_B} - \frac{1}{QE_C}\right), \tag{7}$$

and defining an adjusted quantum efficiency (QE) as:

$$QE'_x = \frac{1}{Q}*QE_x. \tag{8}$$

Equation (8) may then be combined with equation (6) to further approximate black level (BL) as:

$$BL = \frac{S_R}{QE'_R} + \frac{S_G}{QE'_G} + \frac{S_B}{QE'_B} - \frac{S_C}{QE'_C}. \tag{9}$$

The local black level (BL) value for each of the individual pixel clusters may subsequently be determined based on equation (9) and image signals (e.g., the color signals and panchromatic signals of the first pixel cluster 431) of a respective one of the pixel clusters. In other words, the local black level value is determined by calculating a difference between a sum of the plurality of color signals (e.g., a red color signal, a blue color signal, and a green color signal) and the panchromatic signal for each of the pixel clusters of the image pixel array 406. The plurality of color signals and the panchromatic signal are compensated by the respective quantum efficiencies of the red pixel, the blue pixel, the green pixel, and the clear pixel included in a corresponding one of the pixel clusters of the image pixel array 406. In one embodiment, a first local black level value included in the local black level values associated with the first pixel cluster 431 is determined and subsequently used for correcting a first image signal included in the image signals associated with the first pixel cluster 431.

In some embodiments, each pixel cluster may contain more than one red, blue, green, or clear pixel. In such embodiments, an average or mean value of signals representing the same color (e.g., red, green, blue, or panchromatic signal) is determined. For example, in some embodiments there may be multiple panchromatic pixels per pixel cluster, which would produce multiple panchromatic image signals and could be summed together followed by the resulting sum divided by the total number of panchromatic signals of the pixel cluster to determine an average panchromatic signal for determining the local black level value of that particular pixel cluster.

It is appreciated that the above equations are merely illustrative of one possible solution to solving for the local black level value of an individual pixel cluster based on that specific pixel cluster's color signals and panchromatic signal. The local black level value of an individual pixel cluster may also be determined using other techniques, such as, but not limited to, numerical analysis to solve for BL of equation (4). Additionally, it is appreciated that other equations and/or algorithms may be utilized to solve for the local black level value. For example, in some embodiments, the color filters may allow for overlapping ranges of the visible spectrum of light to pass through such that a compensation coefficient for each of the flux (L) values may be incorporated to ensure equation (3) remains accurate.

After the local black level value for each of the pixel clusters included in the image pixel array 406 is determined, block 452 proceeds to block 454 to determine a mean black level value for each of the difference subsections (e.g., first subsection 433 and second subsection 435) of the image pixel array 406 based on the local black level values. Each of the different subsections may represent an array of pixel clusters that may be tiled or arranged to be representative of the image pixel array 406.

The pixel clusters are grouped into different subsections to achieve a reasonable resolution for the black level value. This is achieved by optionally applying a median filter to remove outliers or pixel values that do not accurately represent measured signal values of the different subsections. The mean black level value of the different subsections is then determined as follows:

$$BL_{mean} = \frac{1}{n}\sum_{i=1}^{n} BL_i \qquad (10)$$

where $BL_i$ is the black level value for individual pixel clusters within a specific one of the different subsections, and n represents the total number of pixel clusters within that specific one of the different subsections. In other words, the local black level values are grouped into a plurality of groups of local black level value with each of the groups of local black level values being representative of different subsections of the image pixel array 406. Then, based on equation (10), for example a mean black level value for each of the different subsections of the image pixel array 406 is determined.

Once a mean black level value of each of the different subsections of the image pixel array 406 is determined, block 454 proceeds to block 456. Block 456 shows determining a gain factor ($G_{mean}$) of each of the different subsections and applying an exponentially weighted moving average (EWMA) filter to correct the gain factor. As illustrated, block 456 is also coupled to block 404, as the gain factor is based, at least in part, on the global black level value determined in block 404. The gain factors ($G_{mean}$) of each of the different subsections is determined based on a ratio of the mean black level value (e.g., determined in block 454 with equation 10) with respect to the global black level value (e.g., determined from block 404). More specifically, the gain factor ($G_{mean}$) of a specific one of the different subsections may correspond to $BL_{mean}/BL_{global}$, where $BL_{mean}$ is the mean black level value of the specific one of the different subsections.

The accuracy of the calibration is further improved by filtering (e.g., with a first filter) the gain factor from image to image (i.e., the gain factor is dependent on the previous images gain factor). Since small errors in the quantum efficiency ($QE_X$) are magnified by higher signal levels (e.g., operating in normal ambient lighting conditions or brighter), the gain factor ($G_{mean}$) is weighted so that when there is a higher signal to black level ratio (e.g., a signal-to-dark ratio), the gain factor contributes less to the calibration, or in some circumstances even disables the calibration altogether. In other words, the filtering of the gain factor (e.g., with the first filter) weights the calibration for local non-uniformity to be utilized when it is most prevalent (e.g., low light conditions). Thus, the first filter is applied to the gain factor for each of the different subsections to dynamically adjust the gain factor based, at least in part, on a signal-to-dark ratio of the image signals associated with each of the different subsections with respect to the global black level value.

In some embodiments, the first filter is an exponentially weighted moving average (EWMA) filter, where α is dynamically controlled by the signal-to-dark ratio:

$$G_t = \alpha * G_{mean} + (1-\alpha) * G_{t-1} \qquad (11)$$

where $G_t$ corresponds to the corrected gain factor, $G_{mean}$ is the gain factor of each of the different subsections calculated based on the ratio of $BL_{mean}/BL_{global}$, $G_{t-1}$ is the previously corrected gain factor (e.g., the corrected gain factor of an immediately previous or otherwise previously captured image frame), and α is a value dynamically controlled by the signal-to-dark ratio. The signal-to-dark ratio is the ratio of a mean panchromatic signal with respect to the global black level value. The mean panchromatic signal for each of the different subsections is determined by summing the panchromatic signal(s) of each of the pixel clusters within a particular one of the different subsections together and dividing by the total number of panchromatic signals for that particular one of the different subsections. Then based on the value of the signal-to-dark ratio, α is determined. For example, in some embodiments, if the signal-to-dark ratio is less than 2, α is 1/8. If the signal-to-dark ratio is less than 4, but greater than or equal to 2, α is 1/16. If the signal-to-dark ratio is less than 8, but greater than or equal to 4, α is 1/32. Finally, if the signal-to-dark ratio is greater than or equal to 8, α is 0. It is appreciated that the relationship between the signal-to-dark ratio and α is merely illustrative, and that other relationships may be utilized in the various embodiments of the disclosure.

Once the gain factor for each of the different subsections is determined, block 456 proceeds to block 458. Block 458 illustrates generating a 2D gain array (e.g., as illustrated in FIG. 3) based on the gain factor (or corrected gain factor) of each of the different subsections. The 2D gain array is representative of the image pixel 406.

Block 458 proceeds to block 460 once the 2D gain array has been generated. Block 460 shows determining a local gain correction factor (e.g., $g_{x,y}$) of one or more pixel clusters within the image pixel array 406. The local gain correction factor for one or more of the pixel clusters (e.g. the first pixel cluster 431) may be determined via interpolations of the 2D gain array. In some embodiments, the interpolation is achieved via bilinear interpolation or bicubic interpolation. The local gain correction factor is representative of a correction coefficient for adjusting the global black level based on the local black level values of a particular pixel or pixel cluster.

Block 460 proceeds to block 462, once the local gain correct factor for the individual pixel clusters is known. Block 462 illustrates correcting image signals of the pixel clusters based on the global black level value and the local gain correction factor. The correction may be done on a per pixel or pixel cluster basis as follows:

$$S_{corr} = S_{raw} - g_{x,y} * BL_{global} \quad (12)$$

where $S_{corr}$ is the corrected image signal value, $S_{raw}$ is the original, uncorrected for black level image signal value measured in block 450, $g_{x,y}$ is the local gain correction factor calculated for the specific pixel or pixel cluster associated with the image signals being corrected which may be extracted from the 2D gain array, and $BL_{global}$ is the global black level value determined in block 404. Thus, the global black level value is adjusted based on the local gain correction factor (and corresponding local black level value, such as a first local black level value) of the particular pixel or pixel cluster being corrected (e.g., the first pixel cluster 431) to generate a corrected image signal (e.g., $S_{corr}$) based on the difference between the uncorrected image signal (e.g., a first image signal corresponding to one of the pixels included in the first pixel cluster 431) and the adjusted global black level value associated with the first pixel cluster 431. In some embodiments, it is desirable to correct the black level value on a color plane basis, in which the global black level value determined per color plane may be used instead.

It appreciated that in some embodiments, the black level correction incorporates the same filtering scheme for determining the global black level value as determining the local black level value. In other words, the global black level value may be determined by utilizing a similar median filter, averaging (e.g., mean) determination, frame-to-frame EWMA filter, and the like.

Block 462 then proceeds to block 464, which shows outputting a plurality of corrected image signals which correspond to the image or video captured that has been corrected for black level error. The correction for black level error compensates for local non-uniformity based on the local black level value of a particular pixel or pixel cluster.

The processes explained above may be implemented using software and/or hardware. The techniques described may constitute machine-executable instructions embodied within a tangible or non-transitory machine (e.g., computer) readable storage medium, that when executed by a machine (e.g., controller 120 of FIG. 1A) will cause the machine to perform the operations described. Additionally, the processes may be embodied within hardware, such as an application specific integrated circuit ("ASIC"), field programmable gate array (FPGA), or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An imaging system, comprising:
an image pixel array including pixel clusters adapted to generate image signals in response to incident light, wherein the image signals generated by each of the pixel clusters includes a plurality of color signals and a panchromatic signal;
a dark pixel array adapted to generate one or more black reference signals corresponding to a global black level value of the imaging system; and
a controller coupled to the image pixel array and the dark pixel array, wherein the controller includes logic that when executed by the controller causes the imaging system to perform operations including:
determining local black level values for each of the pixel clusters based on the color signals and the panchromatic signal of a respective one of the pixel clusters; and
correcting a first image signal included in the image signals associated with a first pixel cluster included in the pixel clusters based, at least in part, on the global black level value and a first local black level value included in the local black level values associated with the first pixel cluster.

2. The imaging system of claim 1, wherein each of the pixel clusters includes a red pixel, a blue pixel, a green pixel, and a clear pixel, and wherein the plurality of color signals is representative of the red pixel, the blue pixel, and the green pixel, and wherein the panchromatic signal is representative of the clear pixel.

3. The imaging system of claim 2, wherein the controller includes additional logic that when executed by the controller causes the imaging system to perform further operations including:
calculating a difference between a sum of the plurality of color signals and the panchromatic signal to determine the local black level values of the pixel clusters, wherein the plurality of color signals and the panchromatic signal are compensated by respective quantum efficiencies of the red pixel, the blue pixel, the green pixel, and the clear pixel included in a corresponding one of the pixel clusters of the image pixel array.

4. The imaging system of claim 1, wherein the controller includes additional logic that when executed by the controller causes the imaging system to perform further operations including:

grouping the local black level values into a plurality of groups of local black level values, wherein the groups of local black level values are representative of different subsections of the image pixel array; and determining a mean black level value for the different subsections of the image pixel array based on the grouping of the local black level values.

5. The imaging system of claim 4, wherein the controller includes additional logic that when executed by the controller causes the imaging system to perform further operations including:

determining a gain factor for the different subsections based on a ratio of the mean black level value for the different subsections with respect to the global black level value.

6. The imaging system of claim 5, wherein the controller includes additional logic that when executed by the controller causes the imaging system to perform further operations including:

applying a first filter to the gain factor of the different subsections, wherein the first filter dynamically adjusts the gain factor based, at least in part, on a signal-to-dark ratio of the image signals associated with the different subsections with respect to the global black level value.

7. The imaging system of claim 6, wherein the first filter is an exponentially weighted moving average ("EWMA") filter, wherein the EWMA filter is a dynamic filter based on a previous gain factor of the different subsections, and wherein the signal-to-dark ratio is based on a mean panchromatic signal associated with a respective one of the different subsections.

8. The imaging system of claim 5, wherein the controller includes additional logic that when executed by the controller causes the imaging system to perform further operations including:

generating a two dimensional ("2D") gain array based on the gain factor of the different subsections, wherein the 2D gain array is representative of the image pixel array.

9. The imaging system of claim 8, wherein the controller includes additional logic that when executed by the controller causes the imaging system to perform further operations including:

determining a local gain correction factor for at least the first pixel cluster included in the plurality of pixel clusters via an interpolation of the 2D gain array.

10. The imaging system of claim 9, wherein the interpolation of the 2D gain array to determine the local gain correction factor is achieved via bilinear interpolation or bicubic interpolation.

11. The imaging system of claim 9, wherein the controller includes additional logic that when executed by the controller causes the system to perform further operations including:

adjusting the global black level value based on the local gain correction factor for the first pixel cluster; and generating a corrected image signal based on a difference between the first image signal and the adjusted global black level value associated with the first pixel cluster.

12. A method of black level correction for image sensors, the method comprising:

receiving image signals generated by an array of pixel clusters in response to incident light, wherein groups of the image signals are associated with a respective one of the pixel clusters, and wherein each of the groups of the image signals includes a plurality of color signals and a panchromatic signal;

determining a global black level value of the array of the pixel clusters via one or more black reference signals received from a dark pixel array;

determining local black level values for the pixel clusters, wherein each of the local black level values is based on the color image signals and the panchromatic signal of a corresponding one of the pixel clusters; and correcting a first image signal included in the image signals of a first pixel cluster included in the pixel clusters based, at least in part, on the global black level value and a first local black level value included in the local black level values, wherein the first local black level value is representative of the first pixel cluster.

13. The method of claim 12, wherein each of the pixel clusters includes a red pixel, a blue pixel, a green pixel and a clear pixel, and wherein the plurality of color signals is representative of the red pixel, the blue pixel, and the green pixel, and wherein the panchromatic signal is representative of the clear pixel.

14. The method of claim 13, further comprising:

calculating a difference between a sum of the plurality of color signals and the panchromatic signal associated with each of the pixel clusters to determine the local black level values, wherein the plurality of color signals and the panchromatic signal for each corresponding one of the pixel clusters are compensated by respective quantum efficiencies of the red pixel, the blue pixel, the green pixel, and the clear pixel included in the corresponding one of the pixel clusters.

15. The method of claim 12, further comprising:

grouping the local black level values into a plurality of groups of local black level values, wherein each of the groups of local black level values is representative of different subsections of the array of the pixel clusters; and determining a mean black level value for each of the different subsections of the array of the pixel clusters based on the grouping of the local black level values.

16. The method of claim 15, further comprising:

determining a gain factor for each of the different subsections based on a ratio of the mean black level value for each of the different subsections with respect to the global black level value.

17. The method of claim 16, further comprising:

applying a first filter to the gain factor of each of the different subsections, wherein the first filter dynamically adjusts the gain factor based, at least in part, on a signal-to-dark ratio of the image signals associated with each of the different subsections with respect to the global black level value.

18. The method of claim 17, wherein the first filter is an exponentially weighted moving average ("EWMA") filter, wherein the EWMA filter is a dynamic filter based on a previous gain factor of the different subsections, and wherein the signal-to-dark ratio is based on a mean panchromatic signal associated with a respective one of the different subsections.

19. The method of claim 16, further comprising:
generating a two dimensional ("2D") gain array based on the gain factor of each of the different subsections, wherein the 2D gain array is representative of the image pixel array.

20. The method of claim 19, further comprising:
determining a local gain correction factor for at least the first pixel cluster via interpolation of the 2D gain array.

21. The method of claim 20, further comprising:
adjusting the global black level value based on the local gain correction factor for the first pixel cluster; and
generating a corrected image signal based on a difference between the first image signal and the adjusted global black level value associated with the first pixel cluster.

* * * * *